United States Patent
Bruehl

(10) Patent No.: US 6,305,700 B1
(45) Date of Patent: Oct. 23, 2001

(54) INDEPENDENT SUSPENSION WITH A STEERING KNUCKLE SUPPORTED BY A COUPLING ROD

(75) Inventor: Hubert Bruehl, Waldstetten (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/213,236

(22) Filed: Dec. 17, 1998

(30) Foreign Application Priority Data

Dec. 17, 1997 (DE) .............................................. 197 56 065

(51) Int. Cl.[7] ....................................................... B60G 3/18
(52) U.S. Cl. ........................... 280/124.135; 280/124.134; 280/124.138; 280/124.15
(58) Field of Search ................... 280/124.134, 124.135, 280/124.136, 124.138, 124.139, 124.145, 124.15, 93.51, 93.512

(56) References Cited

U.S. PATENT DOCUMENTS

| | | | |
|---|---|---|---|
| 2,226,406 | * 12/1940 | Krotz ....................................... | 267/21 |
| 3,240,509 | * 3/1966 | Pierce ..................................... | 280/96.1 |
| 4,327,927 | * 5/1982 | Tanaka et al. ......................... | 280/96.1 |
| 4,878,688 | * 11/1989 | Kubo ..................................... | 280/690 |
| 4,978,131 | 12/1990 | Edahiro et al. ........................ | 280/91 |
| 4,986,565 | 1/1991 | Hajto ..................................... | 280/667 |
| 5,284,353 | * 2/1994 | Shinji et al. ........................... | 280/660 |
| 5,405,162 | * 4/1995 | Chum ..................................... | 280/660 |
| 5,415,427 | * 5/1995 | Sommerer et al. ..................... | 280/690 |
| 5,558,360 | * 9/1996 | Lee ......................................... | 280/675 |
| 5,845,926 | * 12/1998 | Davis et al. ........................... | 280/690 |
| 5,895,063 | * 4/1999 | Hasshi et al. ................... | 280/124.134 |
| 6,123,351 | * 9/2000 | Bruehl ............................. | 280/124.135 |

FOREIGN PATENT DOCUMENTS

| | | |
|---|---|---|
| 2642939 C2 | 3/1978 | (DE) . |
| 39 39 312 | 5/1990 | (DE) . |
| 0 374 504 | 6/1990 | (EP) . |
| 08 156 545 A | 6/1896 | (JP) . |
| 9-2032 | 1/1997 | (JP) . |

* cited by examiner

Primary Examiner—J. J. Swann
Assistant Examiner—J. Allen Shriver
(74) Attorney, Agent, or Firm—Crowell & Moring LLP

(57) ABSTRACT

An independent suspension for the front wheels of a motor vehicle with a steering knuckle that is pivotable for steering purposes, has a lower end mounted on a lower link and an upper area supported firstly by a coupling rod to this lower link and secondly by an upper link to the vehicle body. Either the upper link is articulated to the coupling rod in the vicinity of the upper end of the steering knuckle or the coupling rod is articulated to the upper link in the vicinity of the upper end of the steering knuckle. In either case, the steering knuckle requires one less articulation point so that the steering knuckle takes up less space in the immediate vicinity of the wheel.

3 Claims, 3 Drawing Sheets

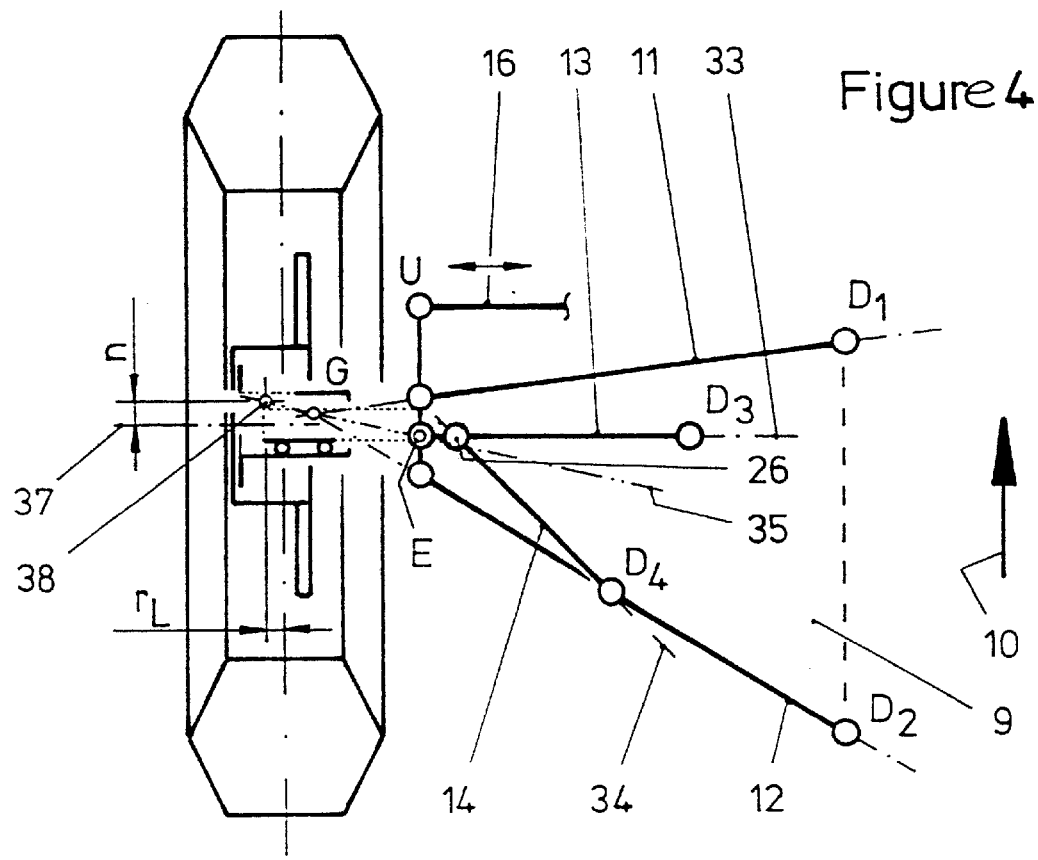

INDEPENDENT SUSPENSION WITH A STEERING KNUCKLE SUPPORTED BY A COUPLING ROD

BACKGROUND OF THE INVENTION

The present invention relates to an independent suspension for the front wheels of a motor vehicle with a steering knuckle that is pivotable for steering purposes. The lower end of the knuckle is mounted on a lower suspension link, and its upper area is supported by a coupling rod to the lower suspension link and by an upper suspension link to the vehicle body.

A compact independent suspension for a steerable motor vehicle wheel is shown in DE 26 42 939. The known steering knuckle is articulated at three points by a lower semi-trailing link and an upper rod link on the vehicle body. The steering knuckle is supported by a coupling rod on the semi-trailing link. The articulation points between the steering knuckle and the two links are located on the steering axis. This limits the space available for the braking device on the wheel.

In addition, an independent suspension is shown in JP 08 156 545 A in which the lower end of the steering knuckle is articulated to the vehicle body by two separate lower individual links that are essentially horizontal. The upper end of the steering knuckle is supported firstly by an upper approximately horizontal individual link on the vehicle body and secondly by a coupling rod to one of the lower individual links. Because the intersection between the coupling rod and the upper individual link is far from the wheel, the line of application of the coupling rod does not intersect the theoretical steering axis. It also does not cross it in the vicinity of the steering knuckle at a short distance. Therefore, the wheel suspension takes up considerable space in the wheel well.

SUMMARY OF THE INVENTION

An object of the present invention is to provide a multilink wheel suspension which, with the smallest possible number of articulation points at the wheel, requires only a small amount of space in the vicinity of the rim depression and the space near the tire.

This object has been achieved by providing an independent suspension with either the upper link is articulated in the vicinity of the upper end of steering knuckle on coupling rod or coupling rod is articulated in the vicinity of the upper end of steering knuckle on upper link and that in both cases, the line of application of upper link and the line of application of coupling rod intersect steering axis and/or cross it at a short distance.

In the novel independent suspension of the present invention, either the upper link is articulated to the coupling rod in the vicinity of the upper end of the steering knuckle or the coupling rod is articulated to the upper link in the vicinity of the upper end of the steering knuckle.

In both arrangements, the steering knuckle requires one less articulation point, so that the steering knuckle requires less space in the immediate vicinity of the wheel. As a result of the backward displacement of the articulation point saved on the steering knuckle, the center of gravity of the unsprung mass of the wheel suspension of the individual wheel is displaced toward the middle of the vehicle, thereby improving driving dynamics.

The line of application of the upper link and the line of application of the coupling rod intersect the theoretical or real steering axis and/or intersect it at a short distance of 1 to 10 mm. This achieves precise steering behavior and minimum tire wear. For example, the upper link or the coupling rod can terminate in space in front of the theoretical steering axis.

In addition, the independent suspension, instead of the prior art lower semi-trailing link, can have two individual links. The two links can be arranged so that their lines of application, at least in the projection on the road, form a triangle that corresponds to a transverse or semi-trailing link. The theoretical steering axis is either cut or intersected by the lines of application. The two links end in space in front of the theoretical steering axis in two separate, adjacent articulation points on the steering knuckle.

In this improvement on the known semi-independent suspension for a four-link axle, the steering axis can be freely selected on the wheel, so that there is sufficient space in the rim area for example for a braking device of large dimensions. The important axle-kinematic parameters such as the scrub or impact radius, the "Stossradius," or the trail for example may be chosen freely despite limited space. By dividing the lower link into two individual links and articulating the coupling rod at or near the line of application of a lower link, a momentary steering axis for the wheel. is produced that passes at least approximately through the point of intersection or crossing of the lines of application of the lower individual links.

BRIEF DESCRIPTION OF THE DRAWINGS

Other objects, advantages and novel features of the present invention will become apparent from the following detailed description of the invention when considered in conjunction with the accompanying drawings.

FIG. 4 is a plan view of the independent suspension shown in FIG. 2.

DETAILED DESCRIPTION OF THE DRAWINGS

Figure 1:
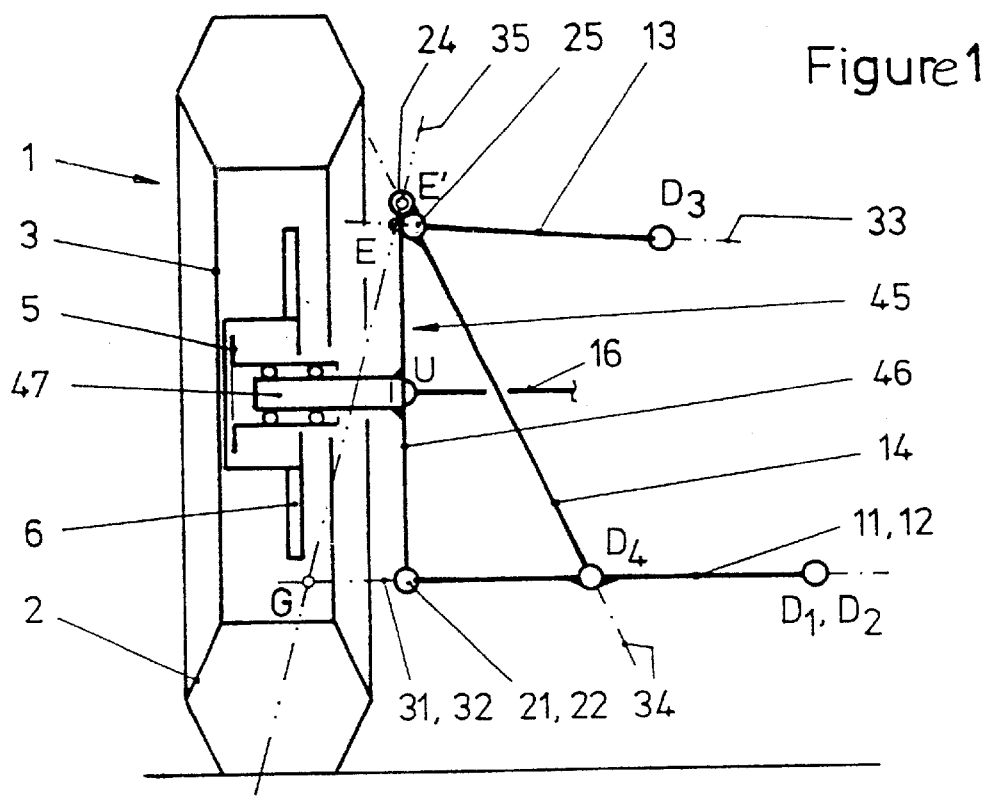
FIG. 1 is a schematic diagram of an independent suspension in a rear view with an upper link that supports the wheel suspension by the coupling rod.

FIG. 1 and FIGS. 2–4 each show embodiments of an independent suspension of a non-powered, steered motor vehicle wheel 1. The wheel 1 that consists of a rim 3 and a tire 2 is mounted on a pivotable stud axle 47. The wheel 1 is mounted by a wheel hub 5 with roller bearings on the stud axle 47. The brake disk 6 is located between the flange of wheel hub 5 and the rim 3.

The steering knuckle 45 which is generally star-shaped shown simplified as a plane four-cornered plate 46 with a shaped, cylindrical stud axle 47. The corners of plate 46 are the articulation points 21–22, 24, U in the embodiment of FIG. 1 and articulation points 21–23, U in the embodiment in FIGS. 2–4.

The steering knuckle 45 is articulated on the vehicle body by four links 11–13, 16 at articulation points $D_1$–$D_3$. The articulation point for the fourth link, i.e. the tie rod section 16, is not shown for purposes of clarity.

The two lower links 11, 12 which terminate at the steering knuckle 45 at articulation points 21 and 22 lie, for example, in a plane that is parallel to the road. Lines of application 31 and 32 of the links 11, 12 form the legs of a triangle 9 whose point on the wheel side theoretically lies on or in the vicinity of the theoretical or momentary steering axis 35. The lower individual links 11, 12 and the steering axis 35 intersect at point G in FIGS. 1–4. Depending on the embodiment, the lines of application 31, 32 intersect the momentary steering axis 35 in the vicinity of the point G. Here the lines of application 31, 32 can likewise only cross instead of cutting one another.

Steering axis 35 in the embodiments intersects the wheel contact patch (FIG. 4) outside its center at point 38. This point, viewed in the direction of travel 10, is located in front of the center by the trail "n". In addition, it is offset from the center by the negative scrub radius "$r_L$."

Between the rear lower link 12 and the steering knuckle 45, a coupling rod 14 is mounted with articulation as seen in FIG. 1. The coupling rod 14 is mounted for this purpose on the link 12 at an articulation point $D_4$ and on the steering knuckle 45 at the articulation point 24, and supports the steering knuckle 45 with respect to the link 12. The articulation point 24 lies on the theoretical steering axis 35 and there forms the uppermost point of the steering knuckle 45. The line of application 34 of the coupling rod 14 in the embodiment of FIG. 1 intersects the theoretical steering axis 35 at point E'.

Above the horizontal wheel center plane, there is a third link 13 between the vehicle body and coupling rod 14. The upper link 13, which in this embodiment is positioned for example in the transverse direction of the vehicle, is supported on the body at articulation point $D_3$ and mounted to coupling rod 14 at the articulation point 25. The articulation points 24, 25 are close together. The line of application 33 can intersect the steering axis 35 at, for example, a short distance, even if the link 13, relative to travel direction 10, for better acceptance of the positive and negative application forces, is mounted far in front of or behind articulation point 25 on the vehicle body.

The line of application 33 of the link 13, which is aligned, for example, approximately horizontally, intersects the theoretical steering axis 35 at point E. It is also contemplated that this line can only cross articulation axis 35 in the vicinity of point E.

In the area ahead of the wheel center plane 37, the articulation point U is mounted, for example, on steering knuckle 45. The articulation point U represents the end of the steering arm that is integrated in plate 46. A tie rod section 16 that is axially parallel is for example, articulatingly mounted therein.

Figure 2:
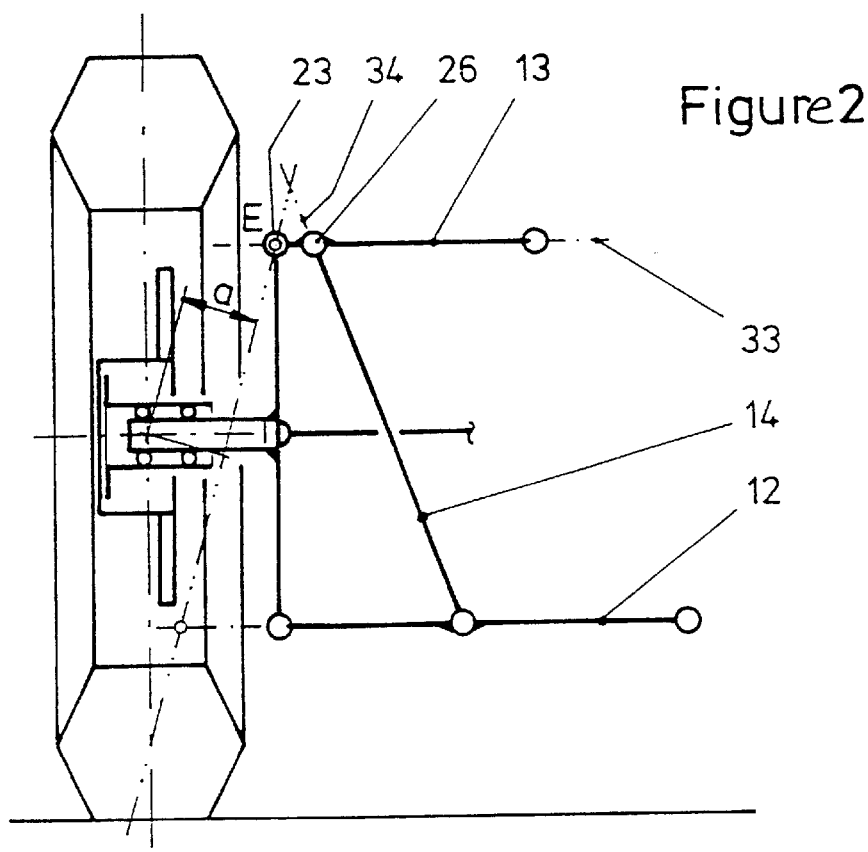
FIG. 2 is the same diagram as FIG. 1, but with a coupling rod that is supported on the upper link.
Figure 3:
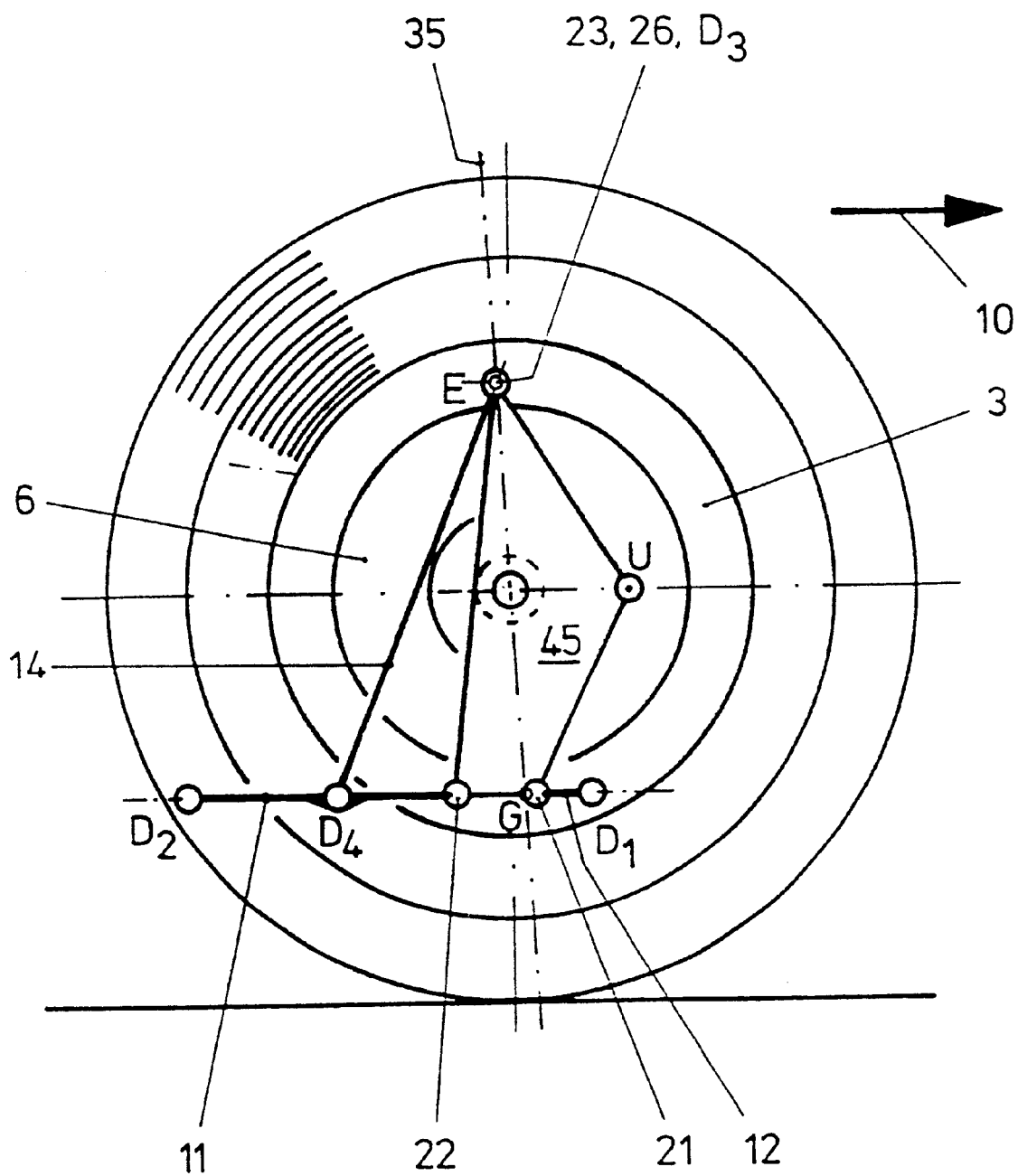
FIG. 3 is a side view of the independent suspension shown in FIG. 2.

In FIGS. 2–4, the upper link x3 articulates the steering knuckle 45 at an articulation point 23. The articulation point in this case lies on steering axis 35. Consequently, the line of application 33 necessarily intersects the steering axis 35.

The coupling rod 14 in this second embodiment of FIGS. 2–4 is located between the rear, lower link 12 and the upper link 13. On the upper link 13, the coupling rod 14 abuts an articulation point 26 located there which is in the vicinity of articulation point 23. The line of application 34 of the coupling rod 14 here crosses steering axis 35 above the point E at a short distance. It can also intersect steering axis 35 depending on the position of the link 13.

The independent suspension is supported with the aid of a conventional (not shown) vehicle spring and a known shock absorber or suspension strut on the vehicle body. The spring and the shock absorber or suspension strut is supported, for example, in the independent suspension at the forward lower link 11. With an independent suspension with driven vehicle wheels, the articulation points on the link 11 are chosen so that the driving jointed shaft has the necessary room to move. Possibly an intermediate element is located between the link and the suspension and/or damping elements, so that the space for moving that the jointed shaft requires is bypassed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An independent suspension for front wheels of a motor vehicle, consisting of a steering knuckle configured to be pivotable for steering about a theoretical steering axis, and having a lower end mounted on a lower link and an upper area supported by a coupling rod to the lower link and by an upper link to a body of the motor vehicle, one of (a) the upper link being articulated proximate an upper end of the steering knuckle to the coupling rod or (b) the coupling rod being articulated proximate the upper end of steering knuckle on the upper link such that a line of application of the upper link and a line of application of the coupling rod are oriented so as to at least one of (i) intersect the momentary steering axis or (ii) cross the momentary steering axis at a short distance from each other without intersecting.

2. The independent suspension according to claim 1, wherein an imaginary extension of the coupling rod is arranged to terminate at or in front of an articulation point on the steering knuckle.

3. The independent suspension according to claim 1, wherein an imaginary extension of the upper link is arranged to terminate at or in front of an articulation point on the steering knuckle.

* * * * *